United States Patent
Tian et al.

(10) Patent No.: US 11,005,651 B2
(45) Date of Patent: May 11, 2021

(54) METHOD AND TERMINAL FOR ESTABLISHING SECURITY INFRASTRUCTURE AND DEVICE

(71) Applicant: CHINA UNIONPAY CO., LTD., Shanghai (CN)

(72) Inventors: Feng Tian, Shanghai (CN); Yisheng Fu, Shanghai (CN); Naigeng Ji, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/980,524

(22) PCT Filed: Jan. 25, 2019

(86) PCT No.: PCT/CN2019/073236
§ 371 (c)(1),
(2) Date: Sep. 14, 2020

(87) PCT Pub. No.: WO2019/179240
PCT Pub. Date: Sep. 26, 2019

(65) Prior Publication Data
US 2021/0014052 A1      Jan. 14, 2021

(30) Foreign Application Priority Data
Mar. 20, 2018   (CN) .......................... 201810230134.0

(51) Int. Cl.
*H04L 9/08* (2006.01)

(52) U.S. Cl.
CPC ............ *H04L 9/0825* (2013.01); *H04L 9/085* (2013.01); *H04L 9/0822* (2013.01); *H04L 9/0861* (2013.01); *H04L 9/0894* (2013.01)

(58) Field of Classification Search
CPC ... H04L 9/0825; H04L 9/0822; H04L 9/0894; H04L 9/085; H04L 9/0861;
(Continued)

(56) References Cited

U.S. PATENT DOCUMENTS

| 2011/0161671 | A1* | 6/2011 | Whitehouse | ........ G06F 21/6236 713/171 |
| 2017/0103388 | A1* | 4/2017 | Pillai | ....................... H04W 4/02 |
| 2018/0167208 | A1* | 6/2018 | Le Saint | .................. H04L 9/14 |

FOREIGN PATENT DOCUMENTS

| CN | 107276756 A | 10/2017 |
| CN | 107810617 A | 3/2018 |
| CN | 108550036 A | 9/2018 |

OTHER PUBLICATIONS

International Search Report for corresponding Application No. PCT/CN2019/073236, dated Apr. 29, 2019.
(Continued)

*Primary Examiner* — Abiy Getachew
(74) *Attorney, Agent, or Firm* — Renner, Otto, Boisselle & Sklar, LLP

(57) ABSTRACT

A method, terminal and device for establishing security infrastructure, comprising: an intermediate service organization receives an organization secret key sent by a third-party service organization; the intermediate service organization encrypts the organization secret key by a first encryption means and sends the encrypted organization secret key to a security storage region of a terminal; the intermediate service organization receives a first terminal public key encrypted by the terminal using a second encryption means; and the intermediate service organization sends the first terminal public key obtained by decryption to the third-party service organization. The organization secret key of the third-party service organization may be sent to the terminal through the intermediate service organization, and
(Continued)

the first terminal public key of the terminal may be sent to the third-party service organization, thus a universal security infrastructure and a technical frame work having good openness may be provided by the intermediate service organization.

20 Claims, 8 Drawing Sheets

(58) Field of Classification Search
CPC . H04L 2209/42; H04L 9/0637; H04L 9/3247; H04L 9/3255; H04L 9/3257; H04L 9/3265; G06F 21/10; G06F 21/44; G06F 21/80; G06F 2221/0744; G06Q 20/00; G06Q 20/02; G06Q 20/04; G06Q 20/14; G06Q 20/24; G06Q 20/3825; G06Q 20/3829; G06Q 20/385; G06Q 30/06; G06Q 30/0601; G07F 7/08; G07F 7/12
See application file for complete search history.

(56) References Cited

OTHER PUBLICATIONS

Written Opinion for corresponding Application No. PCT/CN2019/073236, dated Apr. 29, 2019.

* cited by examiner

METHOD AND TERMINAL FOR ESTABLISHING SECURITY INFRASTRUCTURE AND DEVICE

This application is a national phase entry under 35 U.S.C. § 371 of International Application No. PCT/CN2019/073236, filed on Jan. 25, 2019, which claims priority of Chinese Patent Application No. 201810230134.0, filed with the China National Intellectual Property Administration (CNIPA) on Mar. 20, 2018 and entitled "Method, Terminal and Device for Establishing Secure Infrastructure", the entire content of which is incorporated herein by reference.

FIELD

Embodiments of the invention relate to the field of payment security technology, and in particular to a method, terminal and device for establishing secure infrastructure.

BACKGROUND

The mobile USB key is currently the existing payment solution, which is implemented by mainly using SE (Secure Element) combined with TEE (Trusted Execution Environment). The USB key application in the SE realizes the storage of keys and certificates, and the TEE realizes the human-computer interaction such as biometric identification. Taking the mobile banking transfer scenario as an example: a user confirms the transfer, the mobile banking client invokes the TA (Trust App) of biometric identification, the mobile banking client is allowed to access the USB key program in the SE for signing and return the signature result after the TA completes the user's biometric identification, the mobile banking client sends the transaction to the background, and the background verifies the signature and accepts the transaction. However, the mobile USB key is mainly the direct business between mobile phone manufacturers and banks, and a bank corresponds to a mobile USB key. The lack of service abstraction of service providers results in the poorer openness of the technical framework.

BRIEF SUMMARY

Embodiments of the invention provides a method, terminal and device for establishing security infrastructure, so as to provide a technical framework with better openness.

In a first aspect, embodiments of the invention provide a method for establishing security infrastructure, including:

receiving, by an intermediate service organization, an organization secret key sent by a third-party service organization;

encrypting, by the intermediate service organization, the organization secret key by a first encryption means; wherein the first encryption means is to use a service private key of the intermediate service organization to sign the organization secret key and use a root public key of a terminal to encrypt the signed organization secret key;

sending, by the intermediate service organization, the encrypted organization secret key to a secure storage region of the terminal;

receiving, by the intermediate service organization, a first terminal public key encrypted by the terminal using a second encryption means, wherein the second encryption means is to use a root private key of the terminal to sign the first terminal public key and use a service public key of the intermediate service organization to encrypt the signed first terminal public key; and sending, by the intermediate service organization, the first terminal public key obtained by decryption to the third-party service organization.

A method for establishing security infrastructure provided by the above embodiments includes: an intermediate service organization receives an organization secret key sent by a third-party service organization; the intermediate service organization encrypts the organization secret key by a first encryption means, and sends the encrypted organization secret key to a secure storage region of a terminal, the first encryption means is to use a service private key of the intermediate service organization to sign the organization secret key and use a root public key of the terminal to encrypt the signed organization secret key; the intermediate service organization receives a first terminal public key encrypted by the terminal using a second encryption means, the second encryption means is to use a root private key of the terminal to sign the first terminal public key and use a service public key of the intermediate service organization to encrypt the signed first terminal public key; and the intermediate service organization sends the first terminal public key obtained by decryption to the third-party service organization. It can be seen that the organization secret key of the third-party service organization can be sent to the terminal through the intermediate service organization, and the first terminal public key of the terminal can be sent to the third-party service organization through the intermediate service organization. In this way, the intermediate service organization can not only ensure the security of the terminal and the third-party service organization and provide the common security infrastructure, but also provide the technical framework with better openness.

Preferably, before the intermediate service organization receives the organization secret key sent by the third-party service organization, the method further includes: sending, by the intermediate service organization, the service public key to the secure storage region of the terminal; receiving, by the intermediate service organization, the root public key encrypted by the terminal using a third encryption means, wherein the third encryption means is to use the root private key to sign the root public key and use the service public key to encrypt the signed root public key; and decrypting, by the intermediate service organization, to obtain the root public key.

In a second aspect, embodiments of the invention further provide a method for establishing security infrastructure, including: receiving, by a terminal, an organization secret key of a third-party service organization encrypted by an intermediate service organization using a first encryption means, wherein the first encryption means is to use a service private key of the intermediate service organization to sign the organization secret key and use a root public key of the terminal to encrypt the signed organization secret key; decrypting, by the terminal, to obtain the organization secret key by using a root private key of the terminal and a service public key of the intermediate service organization; storing, by the terminal, the organization secret key in a secure storage region of the terminal; encrypting, by the terminal, a first terminal public key by a second encryption means, wherein the second encryption means is to use the root private key of the terminal to sign the first terminal public key and use the service public key of the intermediate service organization to encrypt the signed first terminal public key; and sending, by the terminal, the encrypted first terminal public key to the intermediate service organization.

Preferably, before the terminal receives the organization secret key of the third-party service organization encrypted by the intermediate service organization using the first encryption means, the method further includes: receiving, by the terminal, the service public key sent by the intermediate service organization; storing, by the terminal, the service public key in the secure storage region; encrypting, by the terminal, the root public key by a third encryption means, wherein the third encryption means is to use the root private key to sign the root public key and use the service public key to encrypt the signed root public key; and sending, by the terminal, the encrypted root public key to the intermediate service organization.

Preferably, after the terminal sends the encrypted first terminal public key to the intermediate service organization, the method further includes: receiving, by the terminal, an application secret key encrypted by the third-party service organization using a fourth encryption means, wherein the fourth encryption means is to use an organization private key to sign the application secret key and use the first terminal public key to encrypt the signed application secret key; decrypting, by the terminal, to obtain the application secret key by using a first terminal private key and an organization public key; wherein the organization secret key comprises the organization public key; storing, by the terminal, the application secret key in the secure storage region of the terminal; and sending, by the terminal, a second terminal public key encrypted by a fifth encryption means to the third-party service organization, wherein the fifth encryption means is to use a second terminal private key to sign the second terminal public key and use the organization public key to encrypt the signed second terminal public key.

Preferably, the method further includes: generating, by the terminal, the root public key, the root private key, the first terminal public key, the first terminal private key, the second terminal public key, and the second terminal private key corresponding to the third-party service organization in an onboard manner.

Preferably, the method further includes: receiving, by the terminal, an access request of a third-party application that is an application corresponding to the third-party service organization; generating, by the terminal, check content; sending, by the terminal, the check content to the third-party service organization; receiving, by the terminal, a checking instruction sent by the third-party service organization, wherein the checking instruction is obtained by the third-party service organization using an application private key to sign the check content; performing, by the terminal, signature verification on the checking instruction by using an application public key; wherein the application secret key comprises the application public key; and allowing, by the terminal, the third-party application to access a secure region of the terminal after the verification passes.

Preferably, the secure storage region of the terminal is a Secure Element (SE) or Trusted Execution Environment (TEE).

In a third aspect, embodiments of the invention provide a method for establishing security infrastructure, including:

encrypting, by a third-party service organization, an application public key by a fourth encryption means, the fourth encryption means being to use an organization private key to sign the application public key and use a first terminal public key to encrypt the signed application public key; sending, by the third-party service organization, the encrypted application public key to a terminal; and receiving, by the third-party service organization, a second terminal public key encrypted by the terminal using a fifth encryption means, wherein the fifth encryption means is to use a second terminal private key to sign the second terminal public key and use an organization public key to encrypt the signed second terminal public key.

Preferably, the method further includes: sending, by the third-party service organization, an access request to the terminal through a third-party application that is an application corresponding to the third-party service organization; receiving, by the third-party service organization, check content sent by the terminal; signing, by the third-party service organization, the check content by using an application private key to generate a checking instruction; sending, by the third-party service organization, the checking instruction to the terminal, so that the terminal performs signature verification on the checking instruction by using the application public key; and allowing the third-party application to access a secure region of the terminal after the verification passes.

In a fourth aspect, embodiments of the invention provide a device for establishing security infrastructure, including: a first receiving module configured to receive an organization secret key sent by a third-party service organization; a first key processing module configured to encrypt the organization secret key by a first encryption means, and instruct a first sending module to send the encrypted organization secret key to a secure storage region of a terminal, wherein the first encryption means is to use a service private key of the intermediate service organization to sign the organization secret key and use a root public key of the terminal to encrypt the signed organization secret key; the first receiving module further configured to receive a first terminal public key encrypted by the terminal using a second encryption means, wherein the second encryption means is to use a root private key of the terminal to sign the first terminal public key and use a service public key of the intermediate service organization to encrypt the signed first terminal public key; and the first sending module configured to send the first terminal public key obtained by decryption to the third-party service organization.

Preferably, before the first receiving module receives the organization secret key sent by the third-party service organization, the first sending module is further configured to send the service public key to the secure storage region of the terminal; the first receiving module is further configured to receive the root public key encrypted by the terminal using a third encryption means, wherein the third encryption means is to use the root private key to sign the root public key and use the service public key to encrypt the signed root public key; and the first key processing module is further configured to decrypt to obtain the root public key.

In a fifth aspect, embodiments of the invention provide a terminal, including: a second receiving module configured to receive an organization secret key of a third-party service organization encrypted by an intermediate service organization using a first encryption means, wherein the first encryption means is to use a service private key of the intermediate service organization to sign the organization secret key and use a root public key of the terminal to encrypt the signed organization secret key; a second key processing module configured to decrypt to obtain the organization secret key by using a root private key of the terminal and a service public key of the intermediate service organization, and store the organization secret key in a secure storage region of the terminal; the second key processing module further configured to encrypt a first terminal public key by a second encryption means, wherein the second encryption means is to use the root private key of the terminal to sign the first terminal public key and use the service public key of the intermediate service organization to encrypt the signed first terminal public key; and a second sending module configured to send the encrypted first terminal public key to the intermediate service organization.

Preferably, before the second receiving module receives the organization secret key of the third-party service organization encrypted by the intermediate service organization using the first encryption means, the second receiving module is further configured to receive the service public key sent by the intermediate service organization, and store the service public key in the secure storage region; the second key processing module is further configured to encrypt the root public key by a third encryption means, wherein the third encryption means is to use the root private key to sign the root public key and use the service public key to encrypt the signed root public key; and the second sending module is further configured to send the encrypted root public key to the intermediate service organization.

Preferably, after the second sending module sends the encrypted first terminal public key to the intermediate service organization, the second receiving module is further configured to receive an application secret key encrypted by the third-party service organization using a fourth encryption means, wherein the fourth encryption means is to use an organization private key to sign the application secret key and use the first terminal public key to encrypt the signed application secret key; the second key processing module is further configured to decrypt to obtain the application secret key by using a first terminal private key and an organization public key, wherein the organization secret key comprises the organization public key; and store the application secret key in the secure storage region of the terminal; and the second sending module is further configured to send a second terminal public key encrypted by a fifth encryption means to the third-party service organization, wherein the fifth encryption means is to use a second terminal private key to sign the second terminal public key and use the organization public key to encrypt the signed second terminal public key.

Preferably, the second key processing module is further configured to: generate the root public key, the root private key, the first terminal public key, the first terminal private key, the second terminal public key, and the second terminal private key corresponding to the third-party service organization in an onboard manner.

Preferably, the second receiving module is further configured to receive an access request of a third-party application that is an application corresponding to the third-party service organization; the second key processing module is further configured to generate check content and send the check content to the third-party service organization; the second receiving module is further configured to receive a checking instruction sent by the third-party service organization, wherein the checking instruction is obtained by the third-party service organization using an application private key to sign the check content; the second key processing module is further configured to perform signature verification on the checking instruction by using an application public key; wherein the application secret key comprises the application public key; and the third-party application is allowed to access a secure region of the terminal after the verification passes.

Preferably, the secure storage region of the terminal is a Secure Element (SE) or Trusted Execution Environment (TEE).

In a sixth aspect, embodiments of the invention provide a device for establishing security infrastructure, including: a third key processing module configured to encrypt an application public key by a fourth encryption means, and send the encrypted application public key to a terminal, wherein the fourth encryption means is to use an organization private key to sign the application public key and use a first terminal public key to encrypt the signed application public key; and a third receiving module configured to receive a second terminal public key encrypted by the terminal using a fifth encryption means, wherein the fifth encryption means is to use a second terminal private key to sign the second terminal public key and use an organization public key to encrypt the signed second terminal public key.

Preferably, the device further includes a third sending module. The third sending module is configured to send an access request to the terminal through a third-party application that is an application corresponding to the device for establishing security infrastructure; the third receiving module is further configured to receive check content sent by the terminal, and instruct the third key processing module to sign the check content by using an application private key to generate a checking instruction; the third sending module is further configured to send the checking instruction to the terminal, so that the terminal performs signature verification on the checking instruction by using the application public key; and the third key processing module is instructed to allow the third-party application to access a secure region of the terminal after the verification passes.

In a seventh aspect, embodiments of the invention provides an electronic device, including: a processor, a memory, a transceiver and a bus interface, wherein the processor, the memory, the transceiver and the bus interface are connected through buses;

the transceiver is configured to receive an organization secret key sent by a third-party service organization; receive a first terminal public key encrypted by a terminal using a second encryption means, and send the first terminal public key obtained by decryption to the third-party service organization; wherein the second encryption means is to use a root private key of the terminal to sign the first terminal public key and use a service public key of the intermediate service organization to encrypt the signed first terminal public key;

the processor is configured to read a program in the memory to perform following operations: encrypting the organization secret key by a first encryption means, and sending the encrypted organization secret key to a secure storage region of a terminal, wherein the first encryption means is to use a service private key of the intermediate service organization to sign the organization secret key and use a root public key of the terminal to encrypt the signed organization secret key;

the memory is configured to store one or more executable programs and store data used by the processor when performing the operations.

In an eighth aspect, embodiments of the invention provide an electronic device, including: a processor, a memory, a transceiver and a bus interface, wherein the processor, the memory, the transceiver and the bus interface are connected through buses;

the transceiver is configured to receive an organization secret key of a third-party service organization encrypted by an intermediate service organization using a first encryption means, and send an encrypted first terminal public key to the intermediate service organization; wherein the first encryption means is to use a service private key of the intermediate service organization to sign the organization secret key and use a root public key of the terminal to encrypt the signed organization secret key;

the processor is configured to decrypt to obtain the organization secret key by using a root private key of the terminal and a service public key of the intermediate service organization, and store the organization secret key in a secure storage region of the terminal; and encrypt a first terminal public key by a second encryption means, wherein the second encryption means is to use the root private key of the terminal to sign the first terminal public key and use the service public key of the intermediate service organization to encrypt the signed first terminal public key.

In a ninth aspect, embodiments of the invention provide an electronic device, including: a processor, a memory, a transceiver and a bus interface, wherein the processor, the memory, the transceiver and the bus interface are connected through buses;

the processor is configured to encrypt an application public key by a fourth encryption means, and send the encrypted application public key to a terminal, wherein the fourth encryption means is to use an organization private key to sign the application public key and use a first terminal public key to encrypt the signed application public key;

the transceiver is configured to receive a second terminal public key encrypted by the terminal using a fifth encryption means, wherein the fifth encryption means is to use a second terminal private key to sign the second terminal public key and use an organization public key to encrypt the signed second terminal public key.

In a tenth aspect, embodiments of the present application provide a non-transitory computer readable storage medium storing instructions, which cause a computer to perform the method in the first aspect or in any possible implementation of the first aspect when running on the computer, or cause a computer to perform the method in the second aspect or in any possible implementation of the second aspect when running on the computer, or cause a computer to perform the method in the third aspect or in any possible implementation of the third aspect when running on the computer.

In an eleventh aspect, embodiments of the present application provide a computer program product containing instructions, which cause a computer to perform the method in the first aspect or in any possible implementation of the first aspect when running on the computer, or cause a computer to perform the method in the second aspect or in any possible implementation of the second aspect when running on the computer, or cause a computer to perform the method in the third aspect or in any possible implementation of the third aspect when running on the computer.

BRIEF DESCRIPTION OF THE DRAWINGS

In order to illustrate the technical solutions in the embodiments of the invention more clearly, the accompanying figures which need to be used in describing the embodiments will be introduced below briefly.

DETAILED DESCRIPTION OF THE EMBODIMENTS

In order to make the objects, technical solutions and beneficial effects of the invention clearer, the invention will further be illustrated below in details with reference to the drawings and the embodiments. It should be understood that the specific embodiments described herein are only used to explain the invention but not to limit the invention.

Figure 1:
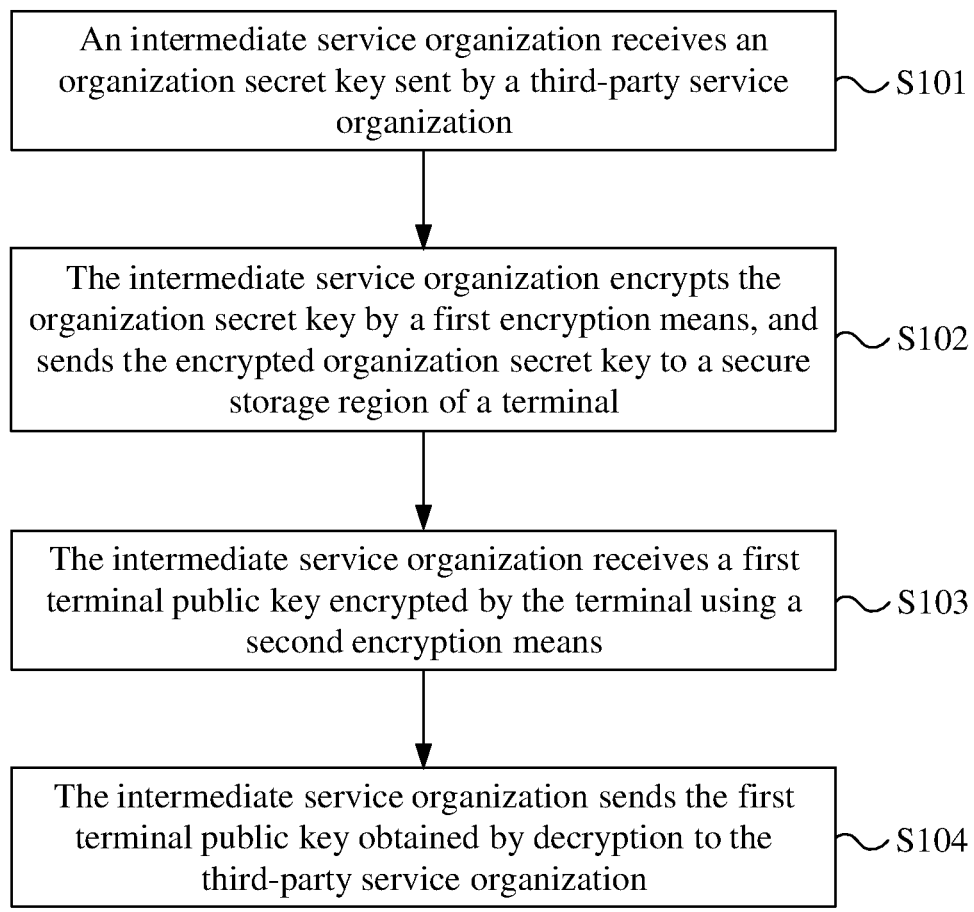
FIG. 1 is a flow chart of a method for establishing security infrastructure provided by an embodiment of the invention.

FIG. 1 exemplarily shows a flow chart of a method for establishing security infrastructure provided by an embodiment of the invention. As shown in FIG. 1, the method may include:

S101: an intermediate service organization receives an organization secret key sent by a third-party service organization.

S102: the intermediate service organization encrypts the organization secret key by a first encryption means, and sends the encrypted organization secret key to a secure storage region of a terminal.

Here, the first encryption means is to use a service private key of the intermediate service organization to sign the organization secret key and use a root public key of the terminal to encrypt the signed organization secret key.

S103: the intermediate service organization receives a first terminal public key encrypted by the terminal using a second encryption means.

Here, the second encryption means is to use a root private key of the terminal to sign the first terminal public key and use a service public key of the intermediate service organization to encrypt the signed first terminal public key.

S104: the intermediate service organization sends the first terminal public key obtained by decryption to the third-party service organization.

It can be seen that the terminal obtains the organization public key of the third-party service organization through the intermediate service organization, and the third-party service organization obtains the first terminal public key of the terminal through the intermediate service organization. Then, the terminal may use the organization public key to encrypt the data sent to the third-party service organization when performing the data communication with third-party service organization, and the third-party service organization may use the first terminal public key to encrypt the data sent to the terminal when communicating with the terminal. In this way, not only can the data security between the terminal and the third-party service organization be ensured, but also such design can provide the technical framework with better openness.

Figure 2:
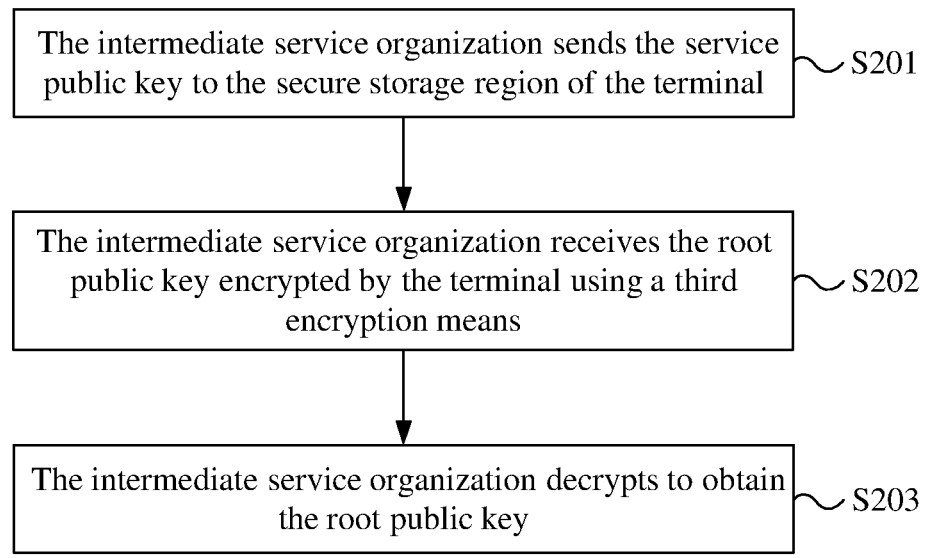
FIG. 2 is a flow chart of a method for establishing the secure communication between a terminal and an intermediate service organization provided by an embodiment of the invention.

In order to improve the communication security between the intermediate service organization and the terminal to enhance the security of the organization secret key in the transmission process, before the intermediate service organization receives the organization secret key sent by the third-party service organization, the following method flow shown in FIG. 2 can further be performed in order to establish the secure communication between the terminal and the intermediate service organization.

S201: the intermediate service organization sends the service public key to the secure storage region of the terminal.

S202: the intermediate service organization receives the root public key encrypted by the terminal using a third encryption means.

Here, the third encryption means is to use the root private key to sign the root public key and use the service public key to encrypt the signed root public key.

S203: the intermediate service organization decrypts to obtain the root public key.

Here, the service public key and the service private key are asymmetric keys of the intermediate service organization, and the first terminal public key and the first terminal private key are asymmetric keys generated by the terminal and stored in the secure storage region of the terminal.

As can be seen, through the above method flow shown in FIG. 2, the terminal obtains the service public key of the intermediate service organization, and the intermediate service organization obtains the root public key of the terminal. Then, the terminal may use the service public key to encrypt the data sent to the intermediate service organization when performing the data communication with the intermediate service organization, and the intermediate service organization may use the root public key to encrypt the data sent to the terminal. In this way, not only can the data security between the terminal and the intermediate service organization be ensured, but also such design can provide the technical framework with better openness.

Figure 3:
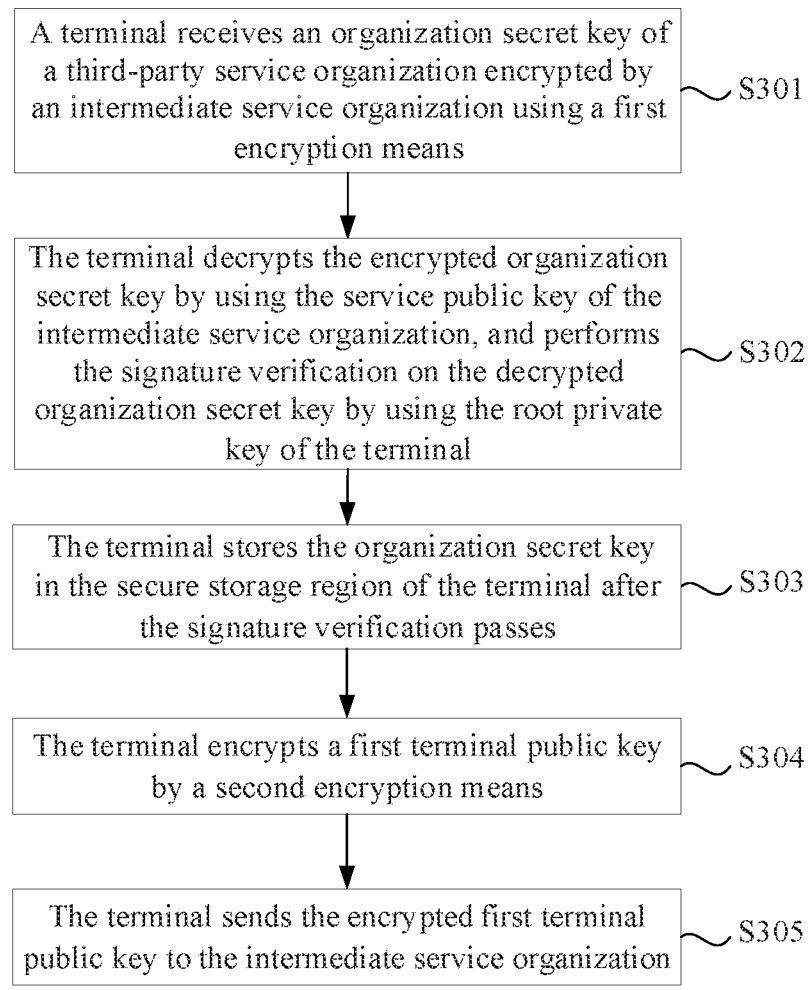
FIG. 3 is a flow chart of a method for establishing security infrastructure provided by another embodiment of the invention.

FIG. 3 exemplarily shows a flow chart of a method for establishing security infrastructure provided by an embodiment of the invention. As shown in FIG. 3, the method may include:

S301: a terminal receives an organization secret key of a third-party service organization encrypted by an intermediate service organization using a first encryption means.

Here, the first encryption means is to use a service private key of the intermediate service organization to sign the organization secret key and use a root public key of the terminal to encrypt the signed organization public key.

S302: the terminal decrypts the encrypted organization secret key by using the service public key of the intermediate service organization, and performs the signature verification on the decrypted organization secret key by using the root private key of the terminal.

S303: the terminal stores the organization secret key in the secure storage region of the terminal after the signature verification passes.

S304: the terminal encrypts a first terminal public key by a second encryption means.

Here, the second encryption means is to use a root private key of the terminal to sign the first terminal public key and use a service public key of the intermediate service organization to encrypt the signed first terminal public key. The first terminal public key is generated by the terminal. When generating the first terminal public key, the terminal also generates the first terminal private key, and the first terminal public key and the first terminal private key are asymmetric keys. The first terminal public key and the first terminal private key may be generated by the terminal after obtaining the organization secret key by decryption and storing the organization secret key in the secure storage region, or may be generated by the terminal in advance.

S305: the terminal sends the encrypted first terminal public key to the intermediate service organization.

Figure 4:
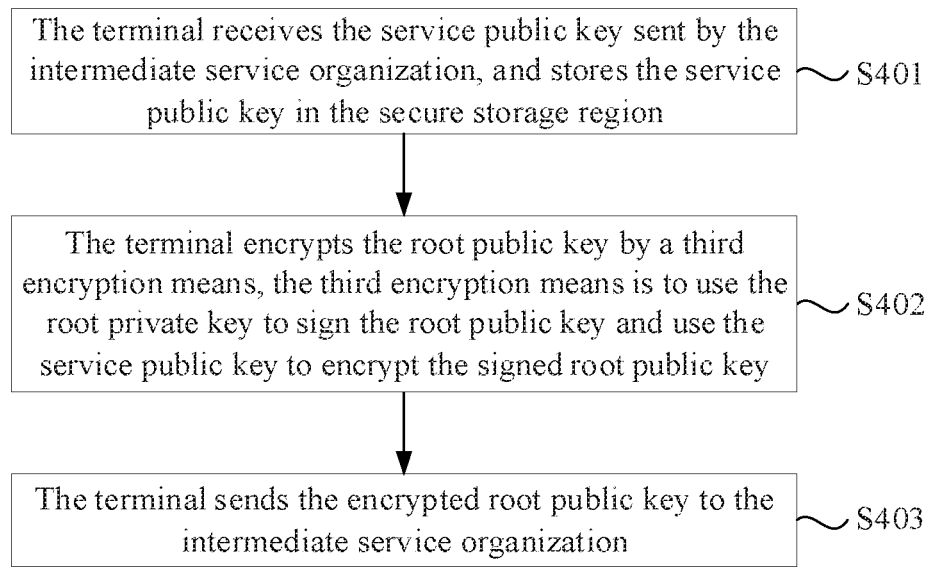
FIG. 4 is a flow chart of a method for establishing the secure communication between a terminal and an intermediate service organization provided by another embodiment of the invention.

In order to improve the communication security between the intermediate service organization and the terminal to enhance the security of the organization secret key in the transmission process, before the terminal receives the organization secret key of the third-party service organization encrypted by the intermediate service organization using the first encryption means, the following method flow shown in FIG. 4 can further be performed in order to establish the secure communication between the terminal and the intermediate service organization.

S401: the terminal receives the service public key sent by the intermediate service organization, and stores the service public key in the secure storage region.

S402: the terminal encrypts the root public key by a third encryption means, the third encryption means is to use the root private key to sign the root public key and use the service public key to encrypt the signed root public key.

S403: the terminal sends the encrypted root public key to the intermediate service organization.

It should be noted that the root public key is generated by the terminal. When generating the root public key, the terminal also generates the root private key, and the root public key and the root private key are asymmetric keys. The root public key and the root private key may be generated by the terminal after receiving the service public key sent by the intermediate service organization and storing the service public key in the secure storage region, or may be generated by the terminal in advance.

Figure 5:
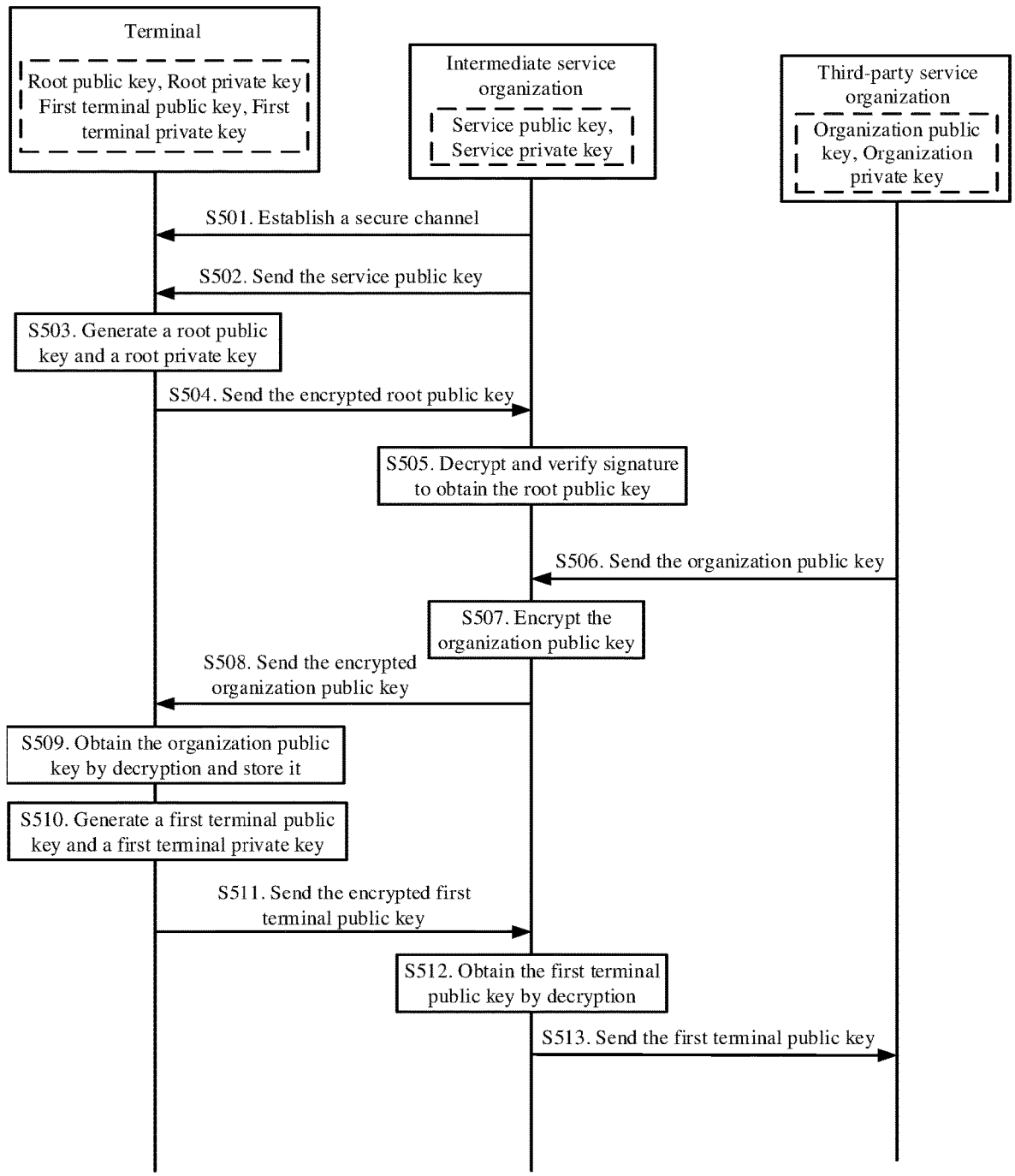
FIG. 5 is a flow chart of a method for establishing security infrastructure provided by another embodiment of the invention.

The above processes shown in FIGS. 1, 2, 3 and 4 will be illustrated below in detail by way of a detailed flow chart, as shown in FIG. 5.

S501: establishing a secure channel between the intermediate service organization and the secure storage region of the terminal.

Specifically, the intermediate service organization may establish the secure channel with the secure storage region of the terminal based on the secure channel protocol GP (GlobalPlatform), SCP (Secure Channel Protocol) series of protocols.

S502: the intermediate service organization sends the service public key to the secure storage region of the terminal through the established secure channel.

Here, the service public key is generated by the intermediate service organization in advance. When generating the service public key, the intermediate service organization further generates the service private key, where the service public key and the service private key are asymmetric keys.

S503: the terminal generates a root public key and a root private key after receiving the service public key sent by the intermediate service organization.

Optionally, the terminal may also generate the root public key and the root private key in advance, the root public key and the root private key are asymmetric keys.

Specifically, the terminal can generate the root public key and the root private key in the onboard generation way, to reduce the transmissions of the root public key and root private key in the network, and improve the security of the root public key and root private key.

S504: the terminal signs the root public key by using the root private key, encrypts the signed root public key by using the service public key, and sends the encrypted root public key to the intermediate service organization.

S505: the intermediate service organization decrypt the root public key sent by the terminal by using the service private key and performs the signature verification by using the root public key obtained by decryption, and the intermediate service organization obtains the root public key of the terminal after the signature verification passes.

So far, the intermediate service organization has sent the service public key to the secure storage region of the terminal, the service private key is still stored inside the intermediate service organization, while the terminal has sent the root public key to the intermediate service organization, and the root private key is still stored in the secure storage region of the terminal. In this way, when the intermediate service organization performs the data communicate with the terminal, the intermediate service organization may use the root public key to encrypt the data sent to the terminal, while the terminal may use the service public key to encrypt the data sent to the intermediate service organization. It can be seen that neither the root private key of the terminal nor the service private key of the intermediate service organization is transmitted in the secure channel. Thus, the security of the data of the terminal and the intermediate service organization can be improved.

Specifically, when the intermediate service organization uses the root public key to encrypt the data sent to the terminal, the terminal can decrypt the encrypted data by using the root private key after receiving the data encrypted by the intermediate service organization using the root public key. After the terminal decrypt the encrypted data by using the root public key, if there is a need to continue communicating with the intermediate service organization, the terminal may encrypt the data sent to the intermediate service organization by using the service public key. After receiving the encrypted data sent by the terminal, the intermediate service organization may decrypt the encrypted data sent by the terminal by using the service private key. Or, when the terminal uses the service public key to encrypt the data sent to the intermediate service organization, the intermediate service organization may decrypt the encrypted data by using the service private key after receiving the encrypted data sent by the terminal. If the intermediate service organization needs to reply to the data sent by the terminal, it may encrypt the reply data by using the root public key. After receiving the encrypted reply data sent by the intermediate service organization, the terminal may decrypt the reply data by using the root private key, to obtain the reply data sent by the intermediate service organization. Since the root private key of the terminal and the service private key of the intermediate service organization are not transmitted in the secure channel all the time, the security of the data of the terminal and the intermediate service organization can be improved.

S506: the third-party service organization sends the organization public key to the intermediate service organization.

Optionally, the organization public key may be generated by the third-party service organization in advance, and the third-party service organization further generates the organization private key when generating the organization public key.

Optionally, the third-party service organization may further send the organization symmetric key to the intermediate service organization when sending the organization public key to the intermediate service organization.

S507: the intermediate service organization encrypts the organization public key by a first encryption means after receiving the organization public key.

Here, the first encryption means is to use a service private key of the intermediate service organization to sign the organization secret key and use a root public key of the terminal to encrypt the signed organization secret key.

Optionally, if the third-party service organization further sends the organization symmetric key when sending the organization public key to the intermediate service organization in the above step S506, then the intermediate service organization further encrypts the organization symmetric key in this step.

S508: the intermediate service organization sends the encrypted organization secret key to the secure storage region of the terminal.

Optionally, if the third-party service organization further sends the organization symmetric key when sending the organization public key to the intermediate service organization in the above step S506, then the intermediate service organization may further sends the organization symmetric key to the secure storage region of the terminal in this step.

S509: the terminal decrypts by using the root private key of the terminal and then verifies the signature by using the service public key of the intermediate service organization, and the terminal stores the organization public key in the secure storage region of the terminal after the signature verification passes.

Optionally, if the third-party service organization further sends the organization symmetric key when sending the organization public key to the intermediate service organization in the above step S506, then the intermediate service organization may further store the organization symmetric key in the secure storage region of the terminal when storing the organization public key in the secure storage region of the terminal in this step, to further provide the openness framework for use by the third-party service organization.

So far, the terminal has obtained the organization public key of the third-party service organization through the intermediate service organization. Thus, the terminal may encrypt the data by using the organization public key of the third-party service organization when sending the data to the third-party service organization again later, and third-party service organization may perform the decryption by using the organization private key of the third-party service organization when receiving the data sent by the terminal.

S510: the terminal generates a first terminal public key and a first terminal private key.

Optionally, the terminal may also generate the first terminal public key and the first terminal private key in advance. Specifically, the terminal may generate the first terminal public key and the first terminal private key in the onboard generation way, so as to reduce the transmissions of the first terminal public key and the first terminal private key in the network, and thereby improve the security of the first terminal public key and the first terminal private key.

S511: the terminal encrypts the first terminal public key by a second encryption means and sends the encrypted second terminal public key to the intermediate service organization.

Here, the second encryption means is to use a root private key of the terminal to sign the first terminal public key and use a service public key of the intermediate service organization to encrypt the signed first terminal public key.

S512: after receiving the encrypted first terminal public key sent by the terminal, the intermediate service organization decrypts it by using the service private key of the intermediate service organization and verifies the signature by using the root public key of the terminal, and obtains the first terminal public key after the signature verification passes.

S513: the intermediate service organization sends the first terminal public key to the third-party service organization.

So far, the terminal has obtained the organization public key of the third-party service organization, while the third-party service organization has obtained the first terminal public key of the terminal. Thus, the third-party service organization may encrypt the data to be sent by using the first terminal public key when sending the data to the terminal later, and the terminal may encrypt the data to be sent by using the organization public key when sending the data to the third-party service organization, where neither the organization private key of the third-party service organization nor the first terminal private key of the terminal is transmitted in the network. In this way, not only can the communication between the terminal and the third-party service organization be ensured, but also such design can provide the technical framework with better openness.

Figure 6:
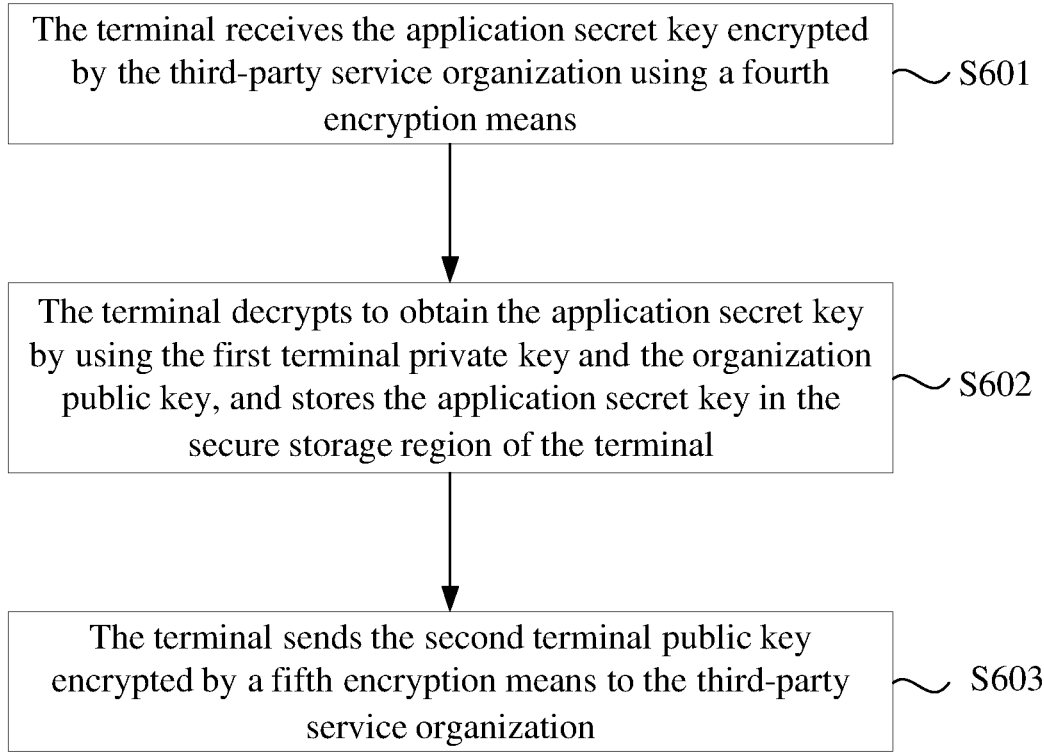
FIGS. 6 and 7 are flow charts of methods for establishing security infrastructure at the application layer provided by embodiments of the invention.

In order to be able to encrypt the application layer at the communication layer, protect the security of the application layer and improve the openness of the technical framework, after the terminal sends the encrypted first terminal public key to the intermediate service organization, the following method flow shown in FIG. 6 may further be performed.

S601: the terminal receives an application secret key encrypted by the third-party service organization using a fourth encryption means.

Here, the fourth encryption means is to use an organization private key to sign the application secret key and use the first terminal public key to encrypt the signed application secret key.

In one embodiment, the application secret key may only include an application public key of the third-party service organization, where the application public key may be generated by the third-party service organization in advance, and the third-party service organization further generates an application private key when generating the application public key.

In another embodiment, the application secret key may include the application public key and the application symmetric key of the third-party organization, an application scenario of the application symmetric key may be: a mobile banking may use this application symmetric key for encryption when transferring the sensitive information such as card number to the mobile banking background; the application public key may be generated by the third-party service organization in advance, and the third-party service organization further generates an application private key when generating the application public key.

S602: the terminal decrypts to obtain the application secret key by using the first terminal private key and the organization public key, and stores the application secret key in the secure storage region of the terminal.

Specifically, the terminal firstly decrypts the encrypted application secret key by using the first terminal private key, and then performs the signature verification on the signed application secret key by using the organization public key. After the signature verification passes, the terminal obtains the application secret key sent by the third-party service organization, and stores the application secret key in the secure storage region of the terminal.

S603: the terminal sends the second terminal public key processed by a fifth encryption means to the third-party service organization.

Here, the fifth encryption means is to use a second terminal private key to sign the second terminal public key and use the organization public key to encrypt the signed second terminal public key. The second terminal public key may be generated by the terminal in advance, and the terminal further generates a second terminal private key when generating the second terminal public key.

Figure 7:
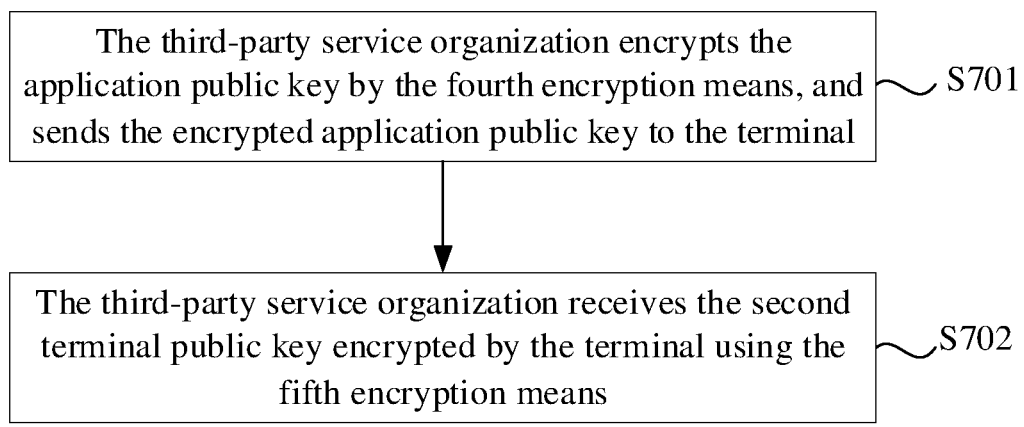

Another embodiment of the invention further provides a method for establishing security infrastructure. As shown in FIG. 7, the method may include:

S701: the third-party service organization encrypts the application public key by the fourth encryption means, and sends the encrypted application public key to the terminal.

Here, the fourth encryption means is to use the organization private key to sign the application public key and use the first terminal public key to encrypt the signed application public key.

In some embodiments, the application secret key may only include the application public key of the third-party service organization, where the application public key may be generated by the third-party service organization in advance, and the third-party service organization further generates an application private key when generating the application public key.

In some other embodiments, the application secret key may include the application public key and the application symmetric key of the third-party organization, an application scenario of the application symmetric key may be: a mobile banking may use this application symmetric key for encryption when transferring the sensitive information such as card number to the mobile banking background; the application public key may be generated by the third-party service organization in advance, and the third-party service organization further generates an application private key when generating the application public key.

S702: the third-party service organization receives the second terminal public key encrypted by the terminal using the fifth encryption means.

Here, the fifth encryption means is to use the second terminal private key to sign the second terminal public key and use the organization secret key to encrypt the signed second terminal public key.

Figure 8:
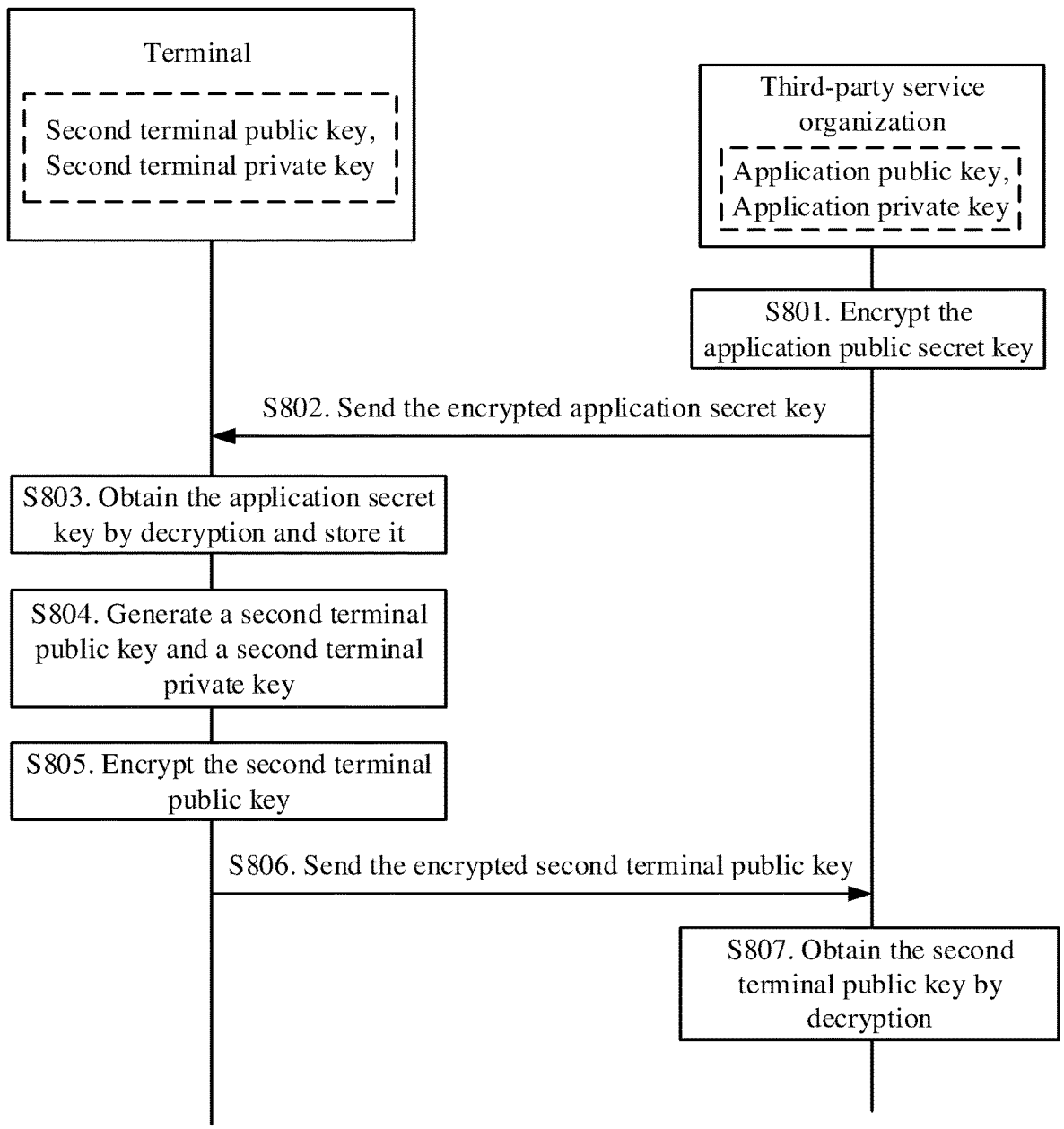
FIG. 8 is a flow chart of a method for establishing security infrastructure at the application layer provided by another embodiment of the invention.

The above processes shown in FIGS. 6 and 7 will be illustrated below in detail by way of the method flow shown in FIG. 8.

S801: the third-party service organization encrypts the application public key by the fourth encryption means.

Here, the fourth encryption means is to use the organization private key to sign the application public key and use the first terminal public key to encrypt the signed application public key.

In some embodiments, the application secret key may only include the application public key of the third-party service organization, where the application public key may be generated by the third-party service organization in advance, and the third-party service organization further generates an application private key when generating the application public key.

In some other embodiments, the application secret key may include the application public key and the application symmetric key of the third-party organization, an application scenario of the application symmetric key may be: a mobile banking may use this application symmetric key for encryption when transferring the sensitive information such as card number to the mobile banking background; the application public key may be generated by the third-party service organization in advance, and the third-party service organization further generates an application private key when generating the application public key.

S802: the third-party service organization sends the encrypted application secret key to the terminal.

S803: the terminal decrypts to obtain the application secret key by using the first terminal private key and the organization public key, and stores the application secret key in the secure storage region of the terminal.

Specifically, the terminal firstly decrypts the encrypted application secret key by using the first terminal private key, and then performs the signature verification on the signed application secret key by using the organization public key. After the signature verification passes, the terminal obtains the application secret key sent by the third-party service organization, and stores the application secret key in the secure storage region of the terminal.

S804: the terminal generates a second terminal public key and a second terminal private key.

Optionally, the terminal may also generate the second terminal public key and the second terminal private key in advance. Specifically, the terminal may generate the second terminal public key and the second terminal private key in the onboard generation way, so as to reduce the transmissions of the second terminal public key and the second terminal private key in the network, and thereby improve the security of the second terminal public key and the second terminal private key.

S805: the terminal encrypts the second terminal public key by the fifth encryption means.

Here, the fifth encryption means is to use a second terminal private key to sign the second terminal public key and use the organization public key to encrypt the signed second terminal public key.

S806: the terminal sends the encrypted second terminal public key to the third-party service organization.

S807: the third-party service organization decrypts the encrypted second terminal public key by using the organization private key, performs the signature verification by using the second terminal public key, and obtains the second terminal public key after the signature verification passes.

So far, the terminal has obtained the application secret key of the third-party service organization at the application layer, and the third-party service organization has obtained the second terminal public key of the terminal at the application layer, but neither the second terminal private key nor the application private key of the third-party service organization is transmitted in the network. In this way, not only can the security of the terminal and the third-party service organization at the application layer be improved, but also such design can provide the technical framework with better openness.

Figure 9:
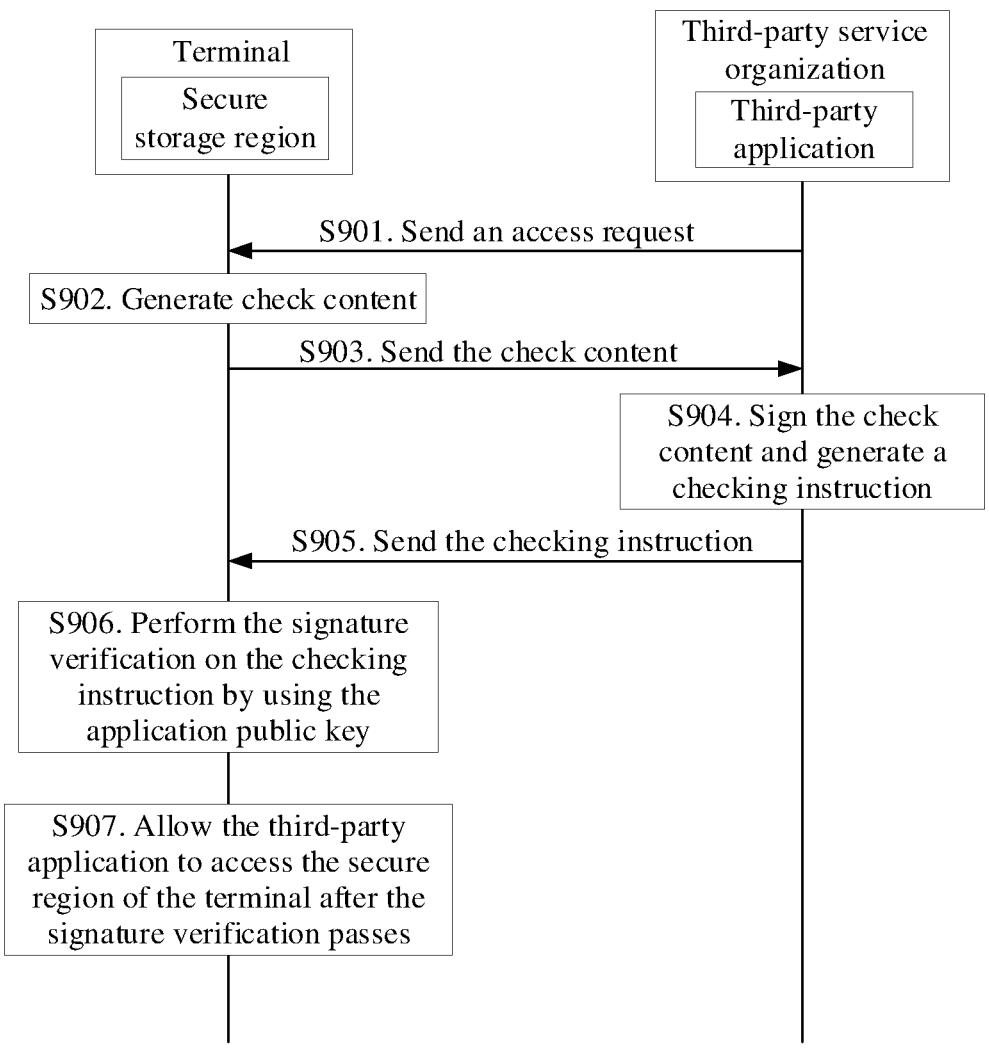
FIG. 9 is a flow chart of an application scenario provided by an embodiment of the invention.

Through the above method flows shown in FIGS. 6 and 7, the terminal obtains the application public key of the third-party service organization. How the terminal uses the application public key of the third-party service organization will be illustrated below in detail by way of a specific application scenario, as shown in FIG. 9.

S901: the third-party service organization sends an access request to the terminal through a third-party application that is an application corresponding to the third-party service organization.

In some embodiments, the third-party application may be client software installed on the terminal.

S902: the terminal receives the access request of the third-party application and generates the check content.

In some embodiments, the check content may be a random number. When the check content is a random number, the terminal may generate the random number through a random number generator.

S903: the terminal sends the generated check content to the third-party service organization.

S904: the third-party service organization receives the check content sent by the terminal, and signs the check content by using the application private key to generate a checking instruction.

S905: the third-party service organization sends the generated checking instruction to the terminal.

S906: the terminal performs the signature verification on the checking instruction by using the application public key after receiving the checking instruction sent by the third-party service organization.

S907: the terminal allows the third-party application to access the secure region of the terminal after the signature verification passes.

In a specific implementation, after the signature verification passes, the terminal can generate a token and allow the third-party application to access the secure region of the terminal within a limited period of time through this token.

It should be noted that the secure storage region of the terminal may be a Secure Element (SE) in the strong security scenario, and the secure storage region of the terminal may be Trusted Execution Environment (TEE) in the weak security scenario.

As can be seen from the above, the third-party service organization obtains the root public key, the first terminal public key and the second terminal public key of the terminal through the intermediate service organization, and the terminal obtains the organization public key and the application public key of the third-party service organization through the intermediate service organization, but none of the root private key, the first terminal private key and the second terminal private key of the terminal as well as the organization private key and the application private key of the third-party service organization is transmitted in the network. In this way, not only can the security of data communication between the terminal and the third-party service organization be ensured, but also the general security infrastructure can be provided by the intermediate service organization, thereby providing the technical framework with better openness.

Figure 10:
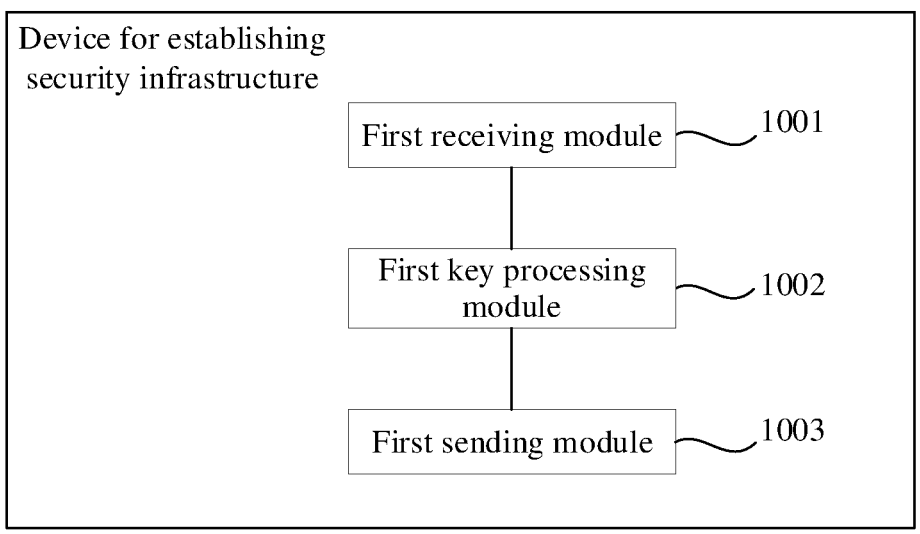
FIG. 10 is a structural schematic diagram of a device for establishing security infrastructure provided by an embodiment of the invention.

Based on the same technical concept, an embodiment of the invention further provides a device for establishing security infrastructure. As shown in FIG. 10, the device may include:

a first receiving module 1001 configured to receive an organization secret key sent by a third-party service organization;

a first key processing module 1002 configured to encrypt the organization secret key by a first encryption means, and instruct a first sending module 1003 to send the encrypted organization secret key to a secure storage region of a terminal, the first encryption means being to use a service private key of the intermediate service organization to sign the organization secret key and use a root public key of the terminal to encrypt the signed organization secret key;

the first receiving module 1001 further configured to receive a first terminal public key encrypted by the terminal using a second encryption means, wherein the second encryption means is to use a root private key of the terminal to sign the first terminal public key and use a service public key of the intermediate service organization to encrypt the signed first terminal public key;

the first sending module 1003 configured to send the first terminal public key obtained by decryption to the third-party service organization.

Preferably, before the first receiving module 1001 receives the organization secret key sent by the third-party service organization, the first sending module 1003 is further configured to send the service public key to the secure storage region of the terminal;

the first receiving module 1001 is further configured to receive the root public key encrypted by the terminal using a third encryption means, wherein the third encryption means is to use the root private key to sign the root public key and use the service public key to encrypt the signed root public key;

the first key processing module 1002 is further configured to decrypt to obtain the root public key.

Figure 11:
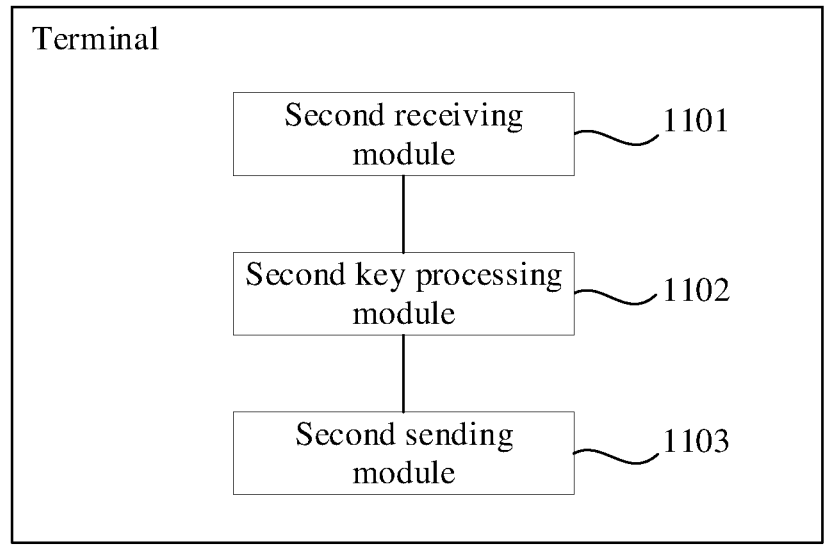
FIG. 11 is a structural schematic diagram of a terminal provided by an embodiment of the invention.

Another embodiment of the invention further provides a terminal. As shown in FIG. 11, the terminal may include:

a second receiving module 1101 configured to receive an organization secret key of a third-party service organization encrypted by an intermediate service organization using a first encryption means, wherein the first encryption means is to use a service private key of the intermediate service organization to sign the organization secret key and use a root public key of the terminal to encrypt the signed organization secret key;

a second key processing module 1102 configured to decrypt to obtain the organization secret key by using a root private key of the terminal and a service public key of the intermediate service organization, and store the organization secret key in a secure storage region of the terminal;

the second key processing module 1102 further configured to encrypt a first terminal public key by a second encryption means, wherein the second encryption means is to use a root private key of the terminal to sign the first terminal public key and use the service public key of the intermediate service organization to encrypt the signed first terminal public key;

a second sending module 1103 configured to send the encrypted first terminal public key to the intermediate service organization.

Preferably, before the second receiving module 1101 receives the organization secret key of the third-party service organization encrypted by the intermediate service organization using the first encryption means, the second receiving module 1101 is further configured to receive the service public key sent by the intermediate service organization, and store the service public key in the secure storage region;

the second key processing module 1102 is further configured to encrypt the root public key by a third encryption means, wherein the third encryption means is to use the root private key to sign the root public key and use the service public key to encrypt the signed root public key;

the second sending module 1103 is further configured to send the encrypted root public key to the intermediate service organization.

Preferably, after the second sending module 1103 sends the encrypted first terminal public key to the intermediate service organization, the second receiving module 1101 is further configured to receive an application secret key encrypted by the third-party service organization using a fourth encryption means, wherein the fourth encryption means is to use an organization private key to sign the application secret key and use the first terminal public key to encrypt the signed application secret key;

the second key processing module 1102 is further configured to decrypt to obtain the application secret key by using the first terminal private key and the organization public key, and store the application secret key in the secure storage region of the terminal;

the second sending module 1103 is further configured to send a second terminal public key encrypted by a fifth encryption means to the third-party service organization, wherein the fifth encryption means is to use the second terminal private key to sign the second terminal public key and use the organization public key to encrypt the signed second terminal public key.

Preferably, the second key processing module 1102 is further configured to:

generate the root public key and root private key, the first terminal public key and first terminal private key, the second terminal public key and second terminal private key corresponding to the third-party service organization in an onboard manner.

Preferably, the second receiving module 1101 is further configured to receive an access request of a third-party application that is an application corresponding to the third-party service organization;

the second key processing module 1102 is further configured to generate check content and send the check content to the third-party service organization;

the second receiving module 1101 is further configured to receive a checking instruction sent by the third-party service organization, wherein the checking instruction is obtained by the third-party service organization using the application private key to sign the check content;

the second key processing module 1102 is further configured to perform signature verification on the checking instruction by using the application public key;

the third-party application is allowed to access a secure region of the terminal after the verification passes.

Preferably, the secure storage region of the terminal is a Secure Element (SE) or Trusted Execution Environment (TEE).

Figure 12:
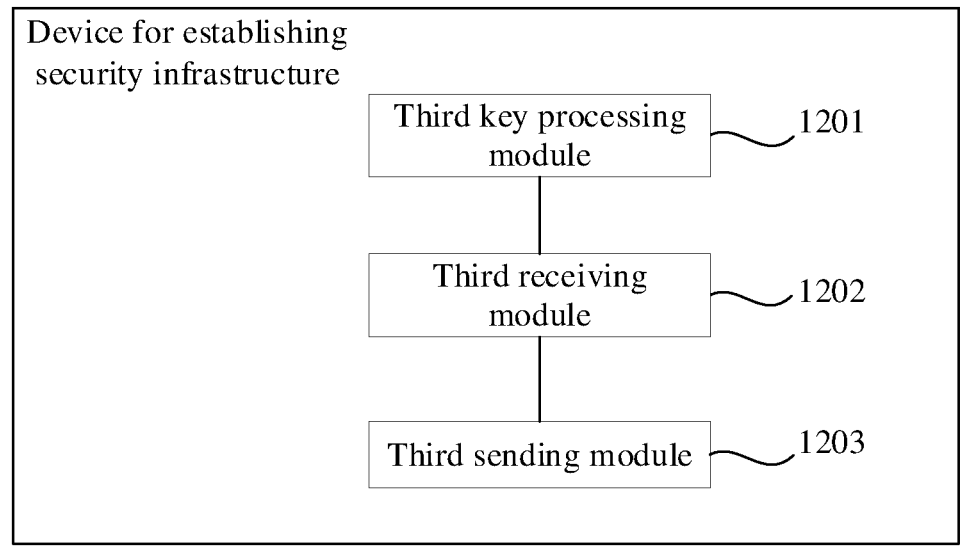
FIG. 12 is a structural schematic diagram of a device for establishing security infrastructure provided by another embodiment of the invention.

Another embodiment of the invention further provides a device for establishing security infrastructure. As shown in FIG. 12, the device may include:

a third key processing module 1201 configured to encrypt an application public key by a fourth encryption means, and send the encrypted application public key to a terminal, wherein the fourth encryption means is to use an organization private key to sign the application public key and use a first terminal public key to encrypt the signed application public key;

a third receiving module 1202 configured to receive a second terminal public key encrypted by the terminal using a fifth encryption means, wherein the fifth encryption means is to use a second terminal private key to sign the second terminal public key and use an organization public key to encrypt the signed second terminal public key.

Preferably, the device further includes: a third sending module 1203;

the third sending module 1203 is configured to send an access request to the terminal through a third-party application that is an application corresponding to the device for establishing security infrastructure;

the third receiving module 1202 is further configured to receive check content sent by the terminal, and instruct the third key processing module to sign the check content by using the application private key to generate a checking instruction;

the third sending module 1203 is further configured to send the checking instruction to the terminal, so that the terminal performs signature verification on the checking instruction by using the application public key;

the third key processing module 1201 is instructed to allow the third-party application to access a secure region of the terminal after the verification passes.

In summary, a method for establishing security infrastructure provided by the above embodiments includes: an intermediate service organization receives an organization secret key sent by a third-party service organization; the intermediate service organization encrypts the organization secret key by a first encryption means, and sends the encrypted organization secret key to a secure storage region of a terminal, wherein the first encryption means is to use a service private key of the intermediate service organization to sign the organization secret key and use a root public key of the terminal to encrypt the signed organization secret key; the intermediate service organization receives a first terminal public key encrypted by the terminal using a second encryption means, wherein the second encryption means is to use a root private key of the terminal to sign the first terminal public key and use a service public key of the intermediate service organization to encrypt the signed first terminal public key; and the intermediate service organization sends the first terminal public key obtained by decryption to the third-party service organization. It can be seen that the organization secret key of the third-party service organization can be sent to the terminal through the intermediate service organization, and the first terminal public key of the terminal can be sent to the third-party service organization through the intermediate service organization. In this way, the intermediate service organization can not only ensure the security of the terminal and the third-party service organization and provide the common security infrastructure, but also provide the technical framework with better openness.

Figure 13:
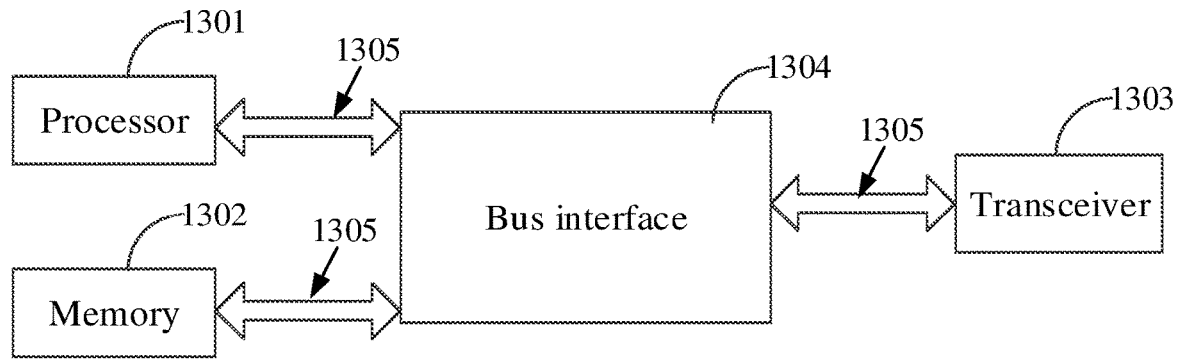
FIG. 13 is a structural schematic diagram of an electronic device provided by an embodiment of the invention.

Based on the same concept, the present application provides an electronic device that can be used to perform the above method flow of establishing security infrastructure on the device side. FIG. 13 is a structural schematic diagram of an electronic device provided by an embodiment of the present application. The electronic device includes a processor 1301, a memory 1302, a transceiver 1303 and a bus interface 1304; wherein the processor 1301, the memory 1302, the transceiver 1303 and the bus interface 1304 are connected to each other through buses 1305.

The memory 1302 is used to store a program; and specifically, the program may include program codes including the computer operation instructions. The memory 1302 may include a volatile memory, e.g., Random-Access Memory (RAM); the memory may also include a non-volatile memory, e.g, flash memory, Hard Disk Drive (HDD) or Solid-State Drive (SSD); and the memory 1302 may also include a combination of the above types of memories.

The memory 1302 stores the elements of: executable modules or data structures, or their subsets, or their extension sets.

Operation instructions include various operation instructions for implementing various operations.

Operation systems include various system programs for implementing various basic services and processing hardware-based tasks.

The bus 1305 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 13, but it does not represent only one bus or only one type of bus.

The bus interface 1304 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1301 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The transceiver 1303 is configured, under the control of the processor 1301, to receive an organization secret key sent by a third-party service organization; receive a first terminal public key encrypted by a terminal using a second encryption means, wherein the second encryption means is to use a root private key of the terminal to sign the first terminal public key and use a service public key of the intermediate service organization to encrypt the signed first terminal public key; and send the first terminal public key obtained by decryption to the third-party service organization;

The memory 1302 is configured to store one or more executable programs and may store the data used by the processor 1301 when performing the operations;

The processor 1301 is configured to read a program in the memory 1302 to perform the following method: encrypting the organization secret key by a first encryption means, and sending the encrypted organization secret key to a secure storage region of a terminal, wherein the first encryption means is to use a service private key of the intermediate service organization to sign the organization secret key and use a root public key of the terminal to encrypt the signed organization secret key.

Preferably, before receiving the organization secret key sent by the third-party service organization, the transceiver 1303 is further configured to send a service public key to the secure storage region of the terminal; and receive the root public key encrypted by the terminal using a third encryption means, wherein the third encryption means is to use the root private key to sign the root public key and use the service public key to encrypt the signed root public key.

The processor 1301 is further configured to decrypt to obtain the root public key.

It should be understood that the division of the above units is only the division of the logical functions, and these units may be fully or partially integrated into a physical entity or may be separated physically in the actual implementations. In some embodiments of the present application, the first receiving module 1001 and the first sending module 1003 may be implemented by the transceiver 1303, and the first key processing unit 1002 may be implemented by the processor 1301. As shown in FIG. 13, the electronic device 1300 may include a processor 1301, a transceiver 1303 and a memory 1302, wherein the memory 1302 may be configured to store the programs/codes pre-installed when the electronic device 1300 leaves the factory, and may also store the codes used to be executed by the processor 1301, etc.

Figure 14:
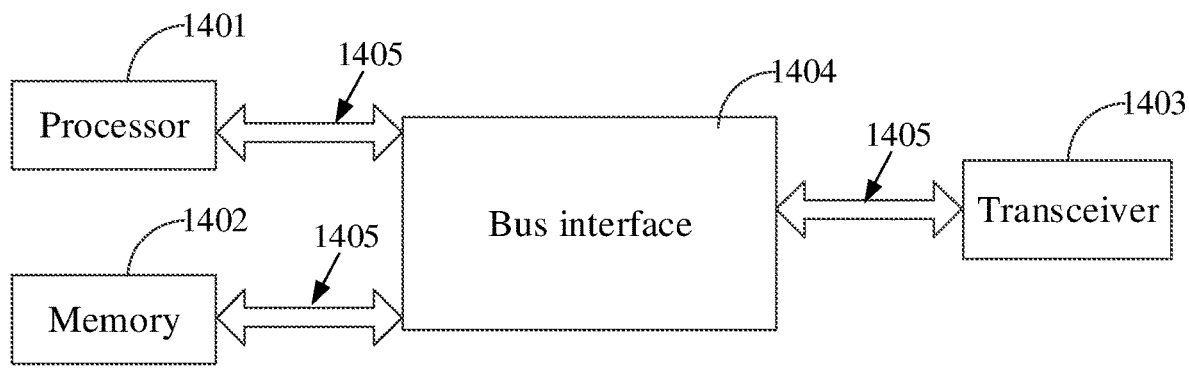
FIG. 14 is a structural schematic diagram of an electronic device provided by an embodiment of the invention.

Based on the same concept, the present application provides an electronic device that can be used to perform the above method flow on the terminal side. FIG. 14 is a structural schematic diagram of an electronic device provided by an embodiment of the present application. The electronic device includes a processor 1401, a memory 1402, a transceiver 1403 and a bus interface 1404; wherein the processor 1401, the memory 1402, the transceiver 1403 and the bus interface 1404 are connected to each other through buses 1405.

The memory 1402 is used to store a program; and specifically, the program may include program codes including the computer operation instructions. The memory 1402 may include a volatile memory, e.g., Random-Access Memory (RAM); the memory may also include a non-volatile memory, e.g, flash memory, Hard Disk Drive (HDD) or Solid-State Drive (SSD); and the memory 1402 may also include a combination of the above types of memories.

The memory 1402 stores the elements of: executable modules or data structures, or their subsets, or their extension sets.

Operation instructions include various operation instructions for implementing various operations.

Operation systems include various system programs for implementing various basic services and processing hardware-based tasks.

The bus 1405 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 14, but it does not represent only one bus or only one type of bus.

The bus interface 1404 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1401 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The transceiver 1403 is configured, under the control of the processor 1401, to receive an organization secret key of a third-party service organization encrypted by an intermediate service organization using a first encryption means, wherein the first encryption means is to use a service private key of the intermediate service organization to sign the organization secret key and use a root public key of the terminal to encrypt a signed organization secret key; and send an encrypted first terminal public key to the intermediate service organization;

The processor 1401 is configured to decrypt to obtain the organization secret key by using a root private key of the terminal and a service public key of the intermediate service organization, and store the organization secret key in a secure storage region of the terminal; and encrypt a first terminal public key by a second encryption means, wherein the second encryption means is to use a root private key of the terminal to sign the first terminal public key and use the service public key of the intermediate service organization to encrypt the signed first terminal public key.

Preferably, before the transceiver 1403 receives the organization secret key of the third-party service organization encrypted by the intermediate service organization using the first encryption means, the transceiver 1403 is further configured to receive the service public key sent by the intermediate service organization, and store the service public key in the secure storage region; the processor 1401 is further configured to encrypt the root public key by a third encryption means, wherein the third encryption means is to use the root private key to sign the root public key and use the service public key to encrypt the signed root public key; and the transceiver 1403 is further configured to send the encrypted root public key to the intermediate service organization.

Preferably, after the transceiver 1403 sends the encrypted first terminal public key to the intermediate service organization, the transceiver 1403 is further configured to receive an application secret key encrypted by the third-party service organization using a fourth encryption means, wherein the fourth encryption means is to use an organization private key to sign the application secret key and use the first terminal public key to encrypt the signed application secret key; the processor 1401 is further configured to decrypt to obtain the application secret key by using the first terminal private key and the organization public key, and store the application secret key in the secure storage region of the terminal; and the transceiver 1403 is further configured to send a second terminal public key encrypted by a fifth encryption means to the third-party service organization, wherein the fifth encryption means is to use the second terminal private key to sign the second terminal public key and use the organization public key to encrypt the signed second terminal private key.

Preferably, the processor 1401 is further configured to: generate the root public key and root private key, the first terminal public key and first terminal private key, the second terminal public key and second terminal private key corresponding to the third-party service organization in an onboard manner.

Preferably, the transceiver 1403 is further configured to receive an access request of a third-party application that is an application corresponding to the third-party service organization; the processor 1401 is further configured to generate check content and send the check content to the third-party service organization; the transceiver 1403 is further configured to receive a checking instruction sent by the third-party service organization, wherein the checking instruction is obtained by the third-party service organization using the application private key to sign the check content; and the processor 1401 is further configured to perform the signature verification on the checking instruction by using the application public key; and allow the third-party application to access a secure region of the terminal after the verification passes.

Preferably, the secure storage region of the terminal is a Secure Element (SE) or Trusted Execution Environment (TEE).

It should be understood that the division of the above units is only the division of the logical functions, and these units may be fully or partially integrated into a physical entity or may be separated physically in the actual implementations. In an embodiment of the present application, the second receiving module 1101 and the second sending module 1103 may be implemented by the transceiver 1403, and the second key processing unit 1102 may be implemented by the processor 1401. As shown in FIG. 14, the electronic device 1400 may include a processor 1401, a transceiver 1403 and a memory 1402, wherein the memory 1402 may be configured to store the programs/codes pre-installed when the electronic device 1400 leaves the factory, and may also store the codes used to be executed by the processor 1401, etc.

Figure 15:
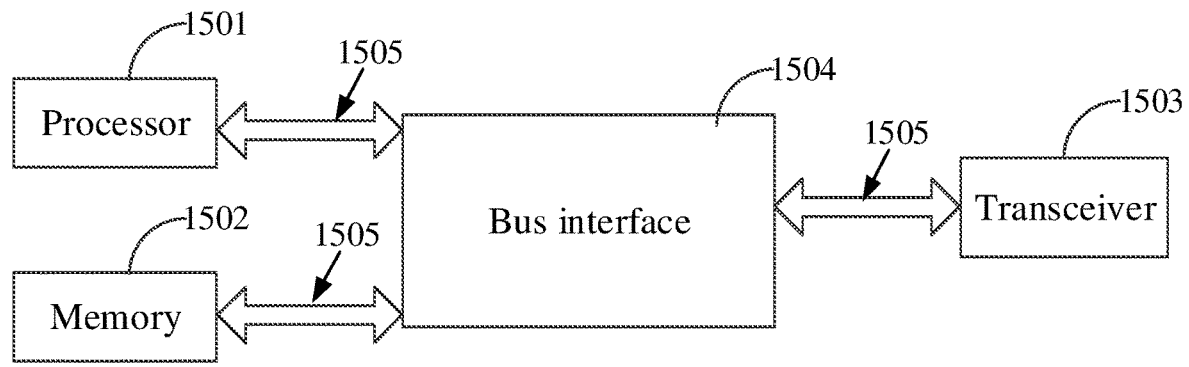
FIG. 15 is a structural schematic diagram of an electronic device provided by an embodiment of the invention.

Based on the same concept, the present application provides an electronic device that can be used to perform the above method flow of establishing security infrastructure on the device side. FIG. 15 is a structural schematic diagram of an electronic device provided by the present application. The electronic device includes a processor 1501, a memory 1502, a transceiver 1503 and a bus interface 1504; wherein the processor 1501, the memory 1502, the transceiver 1503 and the bus interface 1504 are connected to each other through buses 1505.

The memory 1502 is used to store a program; and specifically, the program may include program codes including the computer operation instructions. The memory 1502 may include a volatile memory, e.g., Random-Access Memory (RAM); the memory may also include a non-volatile memory, e.g, flash memory, Hard Disk Drive (HDD) or Solid-State Drive (SSD); and the memory 1502 may also include a combination of the above types of memories.

The memory 1502 stores the elements of: executable modules or data structures, or their subsets, or their extension sets.

Operation instructions include various operation instructions for implementing various operations.

Operation systems include various system programs for implementing various basic services and processing hardware-based tasks.

The bus 1505 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 15, but it does not represent only one bus or only one type of bus.

The bus interface 1504 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1501 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 1501 is configured to encrypt an application public key by a fourth encryption means, and send the encrypted application public key to a terminal, wherein the fourth encryption means is to use an organization private key to sign the application public key and use a first terminal public key to encrypt the signed application public key; and the transceiver 1503 is configured to receive a second terminal public key processed by the terminal using a fifth encryption means, wherein the fifth encryption means is to use a second terminal private key to sign the second terminal public key and use an organization public key to encrypt the signed second terminal public key.

Preferably, the transceiver 1503 is further included; the transceiver 1503 is configured to send an access request to the terminal through a third-party application that is an application corresponding to the electronic device; the transceiver 1503 is further configured to receive check content sent by the terminal, and instruct the processor 1501 to sign the check content by using the application private key to generate a checking instruction; and the transceiver 1503 is further configured to send the checking instruction to the terminal, so that the terminal performs signature verification on the checking instruction by using the application public key; and instruct the processor 1501 to allow the third-party application to access a secure region of the terminal after the verification passes.

It should be understood that the division of the above units is only the division of the logical functions, and these units may be fully or partially integrated into a physical entity or may be separated physically in the actual implementations. In an embodiment of the present application, the third receiving module 1202 and the third sending module 1203 may be implemented by the transceiver 1503, and the third key processing module 1201 may be implemented by the processor 1501. As shown in FIG. 15, the electronic device 1500 may include a processor 1501, a transceiver 1503 and a memory 1502, wherein the memory 1502 may be configured to store the programs/codes pre-installed when the electronic device 1500 leaves the factory, and may also store the codes used to be executed by the processor 1501, etc.

It should be understood by those skilled in the art that the embodiments of the invention may be provided as methods, systems or computer program products. Thus the embodiments of the invention can take the form of hardware embodiments alone, software embodiments alone, or embodiments combining the software and hardware aspects. Also the embodiments of the invention can take the form of computer program products implemented on one or more computer usable storage mediums (including but not limited to magnetic disk memories, CD-ROMs, optical memories and the like) containing computer usable program codes therein.

The embodiments of the invention are described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the embodiments of the invention without departing from the spirit and scope of the present application. Thus the present application is also intended to encompass these modifications and variations therein as long as these modifications and variations to the embodiments of the invention come into the scope of the claims of the present application and their equivalents.

What is claimed is:

1. A method for establishing security infrastructure, comprising:
   receiving, by an intermediate service organization, an organization secret key sent by a third-party service organization;
   encrypting, by the intermediate service organization, the organization secret key by a first encryption method; wherein the first encryption method is to use a service private key of the intermediate service organization to sign the organization secret key and use a root public key of a terminal to encrypt the signed organization secret key;
   sending, by the intermediate service organization, the encrypted organization secret key to a secure storage region of the terminal;
   receiving, by the intermediate service organization, a first terminal public key encrypted by the terminal using a second encryption method, wherein the second encryption method is to use a root private key of the terminal to sign the first terminal public key and use a service public key of the intermediate service organization to encrypt the signed first terminal public key; and
   sending, by the intermediate service organization, the first terminal public key obtained by decryption to the third-party service organization.

2. The method of claim 1, wherein before the receiving, by the intermediate service organization, the organization secret key sent by the third-party service organization, the method further comprises:
   sending, by the intermediate service organization, the service public key to the secure storage region of the terminal;
   receiving, by the intermediate service organization, the root public key encrypted by the terminal using a third encryption method, wherein the third encryption method is to use the root private key to sign the root public key and use the service public key to encrypt the signed root public key; and
   decrypting, by the intermediate service organization, to obtain the root public key.

3. A method for establishing security infrastructure, comprising:
   receiving, by a terminal, an organization secret key of a third-party service organization encrypted by an intermediate service organization using a first encryption method, wherein the first encryption method is to use a service private key of the intermediate service organization to sign the organization secret key and use a root public key of the terminal to encrypt the signed organization secret key;
   decrypting, by the terminal, to obtain the organization secret key by using a root private key of the terminal and a service public key of the intermediate service organization;
   storing, by the terminal, the organization secret key in a secure storage region of the terminal;
   encrypting, by the terminal, a first terminal public key by a second encryption method, wherein the second encryption method is to use the root private key of the terminal to sign the first terminal public key and use the service public key of the intermediate service organization to encrypt the signed first terminal public key; and
   sending, by the terminal, the encrypted first terminal public key to the intermediate service organization.

4. The method of claim 3, wherein before the receiving, by the terminal, the organization secret key of the third-party service organization encrypted by the intermediate service organization using the first encryption method, the method further comprises:
   receiving, by the terminal, the service public key sent by the intermediate service organization;
   storing, by the terminal, the service public key in the secure storage region;
   encrypting, by the terminal, the root public key by a third encryption method, wherein the third encryption method is to use the root private key to sign the root public key and use the service public key to encrypt the signed root public key; and
   sending, by the terminal, the encrypted root public key to the intermediate service organization.

5. The method of claim 4, wherein after the sending, by the terminal, the encrypted first terminal public key to the intermediate service organization, the method further comprises:
   receiving, by the terminal, an application secret key encrypted by the third-party service organization using a fourth encryption method, wherein the fourth encryption method is to use an organization private key to sign the application secret key and use the first terminal public key to encrypt the signed application secret key;
   decrypting, by the terminal, to obtain the application secret key by using a first terminal private key and an organization public key;
   storing, by the terminal, the application secret key in the secure storage region of the terminal; and
   sending, by the terminal, a second terminal public key encrypted by a fifth encryption method to the third-party service organization, wherein the fifth encryption method is to use a second terminal private key to sign the second terminal public key and use the organization public key to encrypt the signed second terminal public key.

6. The method of claim 5, further comprising:
generating, by the terminal, the root public key, the root private key, the first terminal public key, the first terminal private key, the second terminal public key, and the second terminal private key corresponding to the third-party service organization in an onboard manner.

7. The method of claim 5, further comprising:
receiving, by the terminal, an access request of a third-party application that is an application corresponding to the third-party service organization;
generating, by the terminal, check content;
sending, by the terminal, the check content to the third-party service organization;
receiving, by the terminal, a checking instruction sent by the third-party service organization, wherein the checking instruction is obtained by the third-party service organization using an application private key to sign the check content;
performing, by the terminal, signature verification on the checking instruction by using an application public key;
allowing, by the terminal, the third-party application to access a secure region of the terminal after the verification passes.

8. The method of claim 3, wherein the secure storage region of the terminal is a Secure Element, SE, or Trusted Execution Environment, TEE.

9. A method for establishing security infrastructure, comprising:
encrypting, by a third-party service organization, an application public key by a fourth encryption method; wherein the fourth encryption method is to use an organization private key to sign the application public key and use a first terminal public key to encrypt the signed application public key;
sending, by the third-party service organization, the encrypted application public key to a terminal; and
receiving, by the third-party service organization, a second terminal public key encrypted by the terminal using a fifth encryption method, wherein the fifth encryption method is to use a second terminal private key to sign the second terminal public key and use an organization public key to encrypt the signed second terminal public key.

10. The method of claim 9, further comprising:
sending, by the third-party service organization, an access request to the terminal through a third-party application that is an application corresponding to the third-party service organization;
receiving, by the third-party service organization, check content sent by the terminal;
signing, by the third-party service organization, the check content by using an application private key to generate a checking instruction;
sending, by the third-party service organization, the checking instruction to the terminal, so that the terminal performs signature verification on the checking instruction by using the application public key; and
allowing the third-party application to access a secure region of the terminal after the verification passes.

11. An electronic device, comprising a processor, a memory, a transceiver and a bus interface, wherein the processor, the memory and the transceiver are connected through buses;
the transceiver is configured to receive an organization secret key sent by a third-party service organization; receive a first terminal public key encrypted by a terminal using a second encryption method, and send the first terminal public key obtained by decryption to the third-party service organization; wherein the second encryption method is to use a root private key of the terminal to sign the first terminal public key and use a service public key of the intermediate service organization to encrypt the signed first terminal public key;
the processor is configured to read a program in the memory to perform following operations: encrypting the organization secret key by a first encryption method, and sending the encrypted organization secret key to a secure storage region of a terminal, wherein the first encryption method is to use a service private key of the intermediate service organization to sign the organization secret key and use a root public key of the terminal to encrypt the signed organization secret key; and
the memory is configured to store one or more executable programs and store data used by the processor when performing the operations.

12. The electronic device of claim 11, wherein the transceiver is further configured to:
send the service public key to the secure storage region of the terminal; and receive the root public key encrypted by the terminal using a third encryption method, wherein the third encryption method is to use the root private key to sign the root public key and use the service public key to encrypt the signed root public key; and
the processor is further configured to decrypt to obtain the root public key.

13. An electronic device, comprising a processor, a memory, a transceiver and a bus interface, wherein the processor, the memory, the transceiver and the bus interface are connected through buses;
the transceiver is configured to receive an organization secret key of a third-party service organization encrypted by an intermediate service organization using a first encryption method, and send an encrypted first terminal public key to the intermediate service organization; wherein the first encryption method is to use a service private key of the intermediate service organization to sign the organization secret key and use a root public key of the terminal to encrypt the signed organization secret key;
the processor is configured to decrypt to obtain the organization secret key by using a root private key of the terminal and a service public key of the intermediate service organization, and store the organization secret key in a secure storage region of the terminal; and encrypt a first terminal public key by a second encryption method, wherein the second encryption method is to use the root private key of the terminal to sign the first terminal public key and use the service public key of the intermediate service organization to encrypt the signed first terminal public key.

14. The electronic device of claim 13, wherein the transceiver is further configured to: receive the service public key sent by the intermediate service organization, and store the service public key in the secure storage region; and send an encrypted root public key to the intermediate service organization; and
the processor is further configured to encrypt the root public key by a third encryption method, wherein the third encryption method is to use the root private key to sign the root public key and use the service public key to encrypt the signed root public key.

15. The electronic device of claim 14, wherein the transceiver is further configured to: receive an application secret key encrypted by the third-party service organization using a fourth encryption method, and send a second terminal public key encrypted by a fifth encryption method to the third-party service organization; wherein the fourth encryption method is to use an organization private key to sign the application secret key and use the first terminal public key to encrypt the signed application secret key, and the fifth encryption method is to use a second terminal private key to sign the second terminal public key and use the organization public key to encrypt the signed second terminal public key; and the processor is further configured to decrypt to obtain the application secret key by using a first terminal private key and an organization public key, and store the application secret key in the secure storage region of the terminal.

16. The electronic device of claim 15, wherein the transceiver is further configured to:

generate the root public key, the root private key, the first terminal public key, the first terminal private key, the second terminal public key, and the second terminal private key corresponding to the third-party service organization in an onboard manner.

17. The electronic device of claim 15, wherein the transceiver is further configured to:

receive an access request of a third-party application that is an application corresponding to the third-party service organization; and receive a checking instruction sent by the third-party service organization, wherein the checking instruction is obtained by the third-party service organization using an application private key to sign the check content;

the processor is further configured to:

generate check content and send the check content to the third-party service organization; perform signature verification on the checking instruction by using an application public key; and allow the third-party application to access a secure region of the terminal after the verification passes.

18. The electronic device of claim 13, wherein the secure storage region of the terminal is a Secure Element, SE, or Trusted Execution Environment, TEE.

19. An electronic device, comprising a processor, a memory, a transceiver and a bus interface, wherein the processor, the memory, the transceiver and the bus interface are connected through buses;

the processor is configured to encrypt an application public key by a fourth encryption method, and send the encrypted application public key to a terminal, wherein the fourth encryption method is to use an organization private key to sign the application public key and use a first terminal public key to encrypt the signed application public key; and the transceiver is configured to receive a second terminal public key encrypted by the terminal using a fifth encryption method, wherein the fifth encryption method is to use a second terminal private key to sign the second terminal public key and use an organization public key to encrypt the signed second terminal public key.

20. The electronic device of claim 19, wherein the transceiver is further configured to:

send an access request to the terminal through a third-party application that is an application corresponding to the electronic device; receive check content sent by the terminal, and instruct the processor to sign the check content by using an application private key to generate a checking instruction; send the checking instruction to the terminal, so that the terminal performs signature verification on the checking instruction by using the application public key; and instruct the processor to allow the third-party application to access a secure region of the terminal after the verification passes.

\* \* \* \* \*